United States Patent
Barabino

[15] 3,659,264
[45] Apr. 25, 1972

[54] TIRE PRESSURE ALARM SYSTEM
[72] Inventor: William A. Barabino, North Reading, Mass.
[73] Assignee: Safety Research & Engineering Corp.
[22] Filed: July 20, 1970
[21] Appl. No.: 56,347

[52] U.S. Cl..................340/58, 116/34, 180/103, 200/61.25
[51] Int. Cl. ..........................................B60c 23/04
[58] Field of Search.................340/58, 236; 116/34 R; 73/146.2; 200/61.25, 61.22; 180/103

[56] References Cited
UNITED STATES PATENTS

| | | | |
|---|---|---|---|
| 2,182,895 | 12/1939 | Henderson | 116/34 R |
| 3,235,684 | 2/1966 | Jordan et al | 116/34 R |
| 1,724,020 | 8/1929 | Harrington | 116/34 R |

Primary Examiner—John W. Caldwell
Assistant Examiner—Glen R. Swann, III
Attorney—Morse, Altman & Oates

[57] ABSTRACT

A system is provided for signalling an operator that a vehicle's tire pressure is over or under a preset range. A pressure responsive diaphragm within the tire causes a reed to vibrate when the tire pressure goes over or under a predetermined range and vibration of the reed is sensed by a slave reed in the vehicle which, in turn, generates a signal to the operator.

7 Claims, 7 Drawing Figures

INVENTOR.
WILLIAM A. BARABINO

ATTORNEYS

PATENTED APR 25 1972 3,659,264

INVENTOR.
WILLIAM A. BARABINO
BY
Morse, Altman & Oates
ATTORNEYS

TIRE PRESSURE ALARM SYSTEM

BACKGROUND OF THE INVENTION

1. Field of the Invention

This invention relates generally to tire pressure alarm systems and more particularly is directed towards a vibratory reed system for warning of excessive gain or loss of pressure in a tire.

2. Description of the Prior Art

One of the major causes of highway accidents arises from tire failures, often caused by running a tire at a pressure above or below a predetermined safe range. Not only is it dangerous to operate a tire beyond its optimum pressure but such practice also greatly reduces the life of the tire, since the tire will wear unevenly and at a faster rate if the tire pressure is not maintained within a safe limit.

Various types of systems have been developed heretofore for the purpose of signalling the operator that the tire pressure of his vehicle is beyond a safe range. Such systems have been unsatisfactory for various reasons, such as complexity, high cost, unreliability and the like. Accordingly, it is an object of the present invention to provide a new and improved tire pressure alarm system which is of simple, low cost construction, yet durable, reliable and easily installed on existing equipment.

SUMMARY OF THE INVENTION

This invention features a tire pressure alarm system, comprising a reed signalling device in each tire responsive to tire pressure and a receiver including a slave reed on the vehicle adapted to sense the vibration of one or more reeds in each tire. The signalling reed is triggered by means of a diaphragm which moves in response to changes in tire pressure, causing the reed to vibrate when a safe limit is exceeded.

DETAILED DESCRIPTION OF THE PREFERRED EMBODIMENTS

Figure 1:
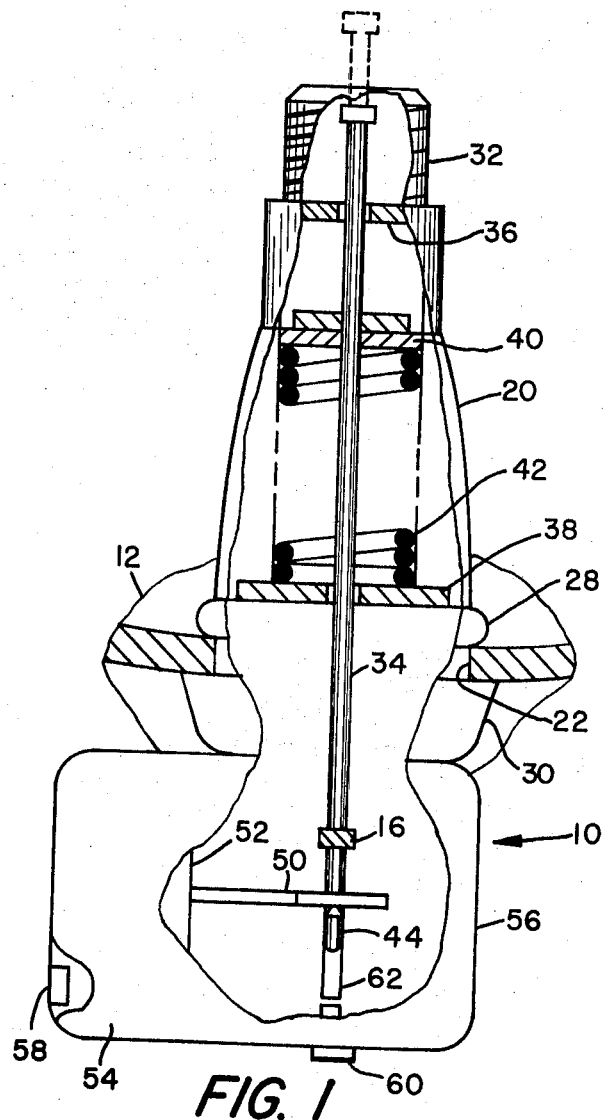
FIG. 1 is a view in side elevation, partly broken away, of a pressure responsive reed signalling device made according to the invention for use on automotive tires.

Referring now to the drawings and to FIGS. 1 through 4 in particular, the reference character 10 generally indicates a pressure responsive signalling device mounted to each wheel 12 of a vehicle such as an automobile 14. The device is adapted to emit a signal whenever the tire pressure drops below or rises above a predetermined safe operating range. In general, the device 10 operates by causing a reed 16 to vibrate when the tire pressure becomes excessively high or low. Vibrations of the reed 16 in each of the tires is sensed by means of slave reed 18 mounted on the vehicle's chassis and, through circuitry to be described below, is adapted to produce a signal to alert the driver.

Figure 2:
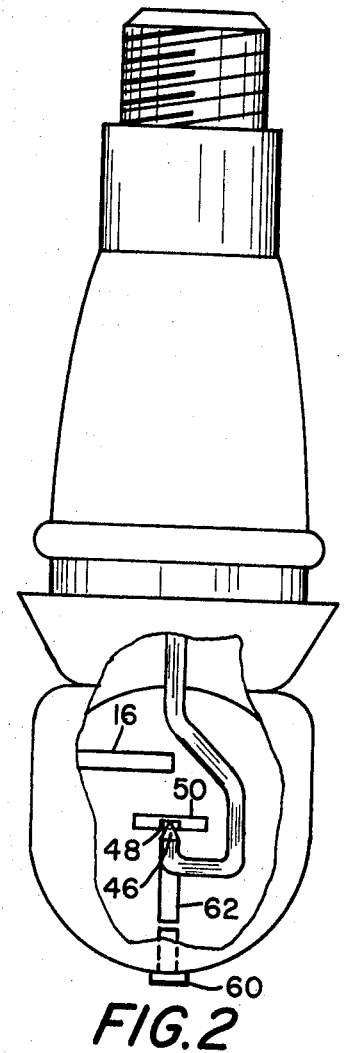
FIG. 2 is a view in end elevation thereof, partly broken away.
Figure 3:
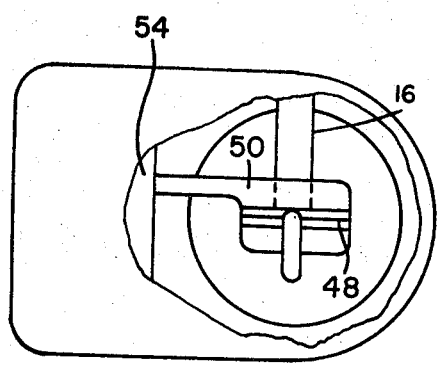
FIG. 3 is a bottom plan view thereof, partly broken away.

Referring now more especially to FIGS. 1, 2 and 3, each device 10 is comprised of a valve 20 extending through an opening 22 formed in a wheel rim 24 to which a tire 26 is mounted. The valve 20 is sealed against the rim by cooperating shoulders 28 and 30 formed about the valve body near the base thereof. The upper portion of the valve body is similar to a conventional tire valve and has a threaded outer end 32 to receive a cap (not shown). Air is pumped into the tire through the valve in the conventional manner by placing an air nozzle over the end of the valve, the air passing down through the valve body into the tire. Within the valve body is mounted an elongated valve stem 34 slidably mounted through annular members 36 and 38 fixed to the valve body and carrying its own annular member 40 fixed thereto. A coil spring 42 is compressed between the members 38 and 40 urging the valve stem upwardly as viewed in FIG. 1.

The lower end of the stem is formed with a hooked portion 44 the tip of which, indicated at 46, engages a channel track 48 formed in the underside of an arm 50 extending from an extensible diaphragm wall 52 forming part of a pressure chamber 54. The arm 50 is formed with an offset portion in which the track 48 is formed whereby the arm can disengage the hook portion of the valve stem from either end of the track. The arm 50 as well as the lower portion of the valve stem are enclosed within a housing 56 which, in turn, is secured to the lower end of the valve 20 and mounted inside the tire 26. Mounted to the inside wall of the housing 56 directly above the arm 50 and in line with the tip 46 is the reed 16 which will be struck by the tip 46 of the valve stem when it is released by the arm 50. The diaphragm 52 is adapted to deflect to the right or to the left as viewed in FIG. 1 depending upon the pressure within the chamber 54. The chamber 54 communicates with the interior of the tire through a restricted opening 58 whereby the tire pressure will cause the diaphragm 52 to move the arm 50 either to the right or to the left.

At normal operating pressures the diaphragm 52 and arm 50 will be in the position shown in FIGS. 1, 2 and 3, with the tip engaging the track 48 substantially at its mid point. In the event that the tire pressure increases this will cause the diaphragm to deflect to the right and, if the pressure exceeds a preset range established by the length of the track 48, it will move beyond the tip releasing the valve stem which will snap upwardly under the force of the spring 42, striking the end of the reed 16 as it passes and causing the reed to vibrate. Similarly, if the tire pressure drops below a safe range, the diaphragm will deflect to the left, pulling the arm 50 to the left and releasing the tip of the stem from the other end of the track. Again, the released valve stem will strike the reed causing it to vibrate.

The vibration of the reed is sensed by the slave reed 18 which is mounted at a suitable location in the vehicle chassis. In practice, the restricted opening 58 between the pressure chamber 54 and the interior of the tire is relatively small so that the sharp transient changes in tire pressure, such as occasioned by the vehicle riding over a rock, pot hole or railroad track, for example, will not appreciably change the pressure within the chamber 54 and therefore will not trigger the reed vibrating mechanism. Only changes in pressure which occur over a relatively long period of perhaps 5 seconds or more, indicating a steady increase or decrease in tire pressure, will be sensed.

Directly below the valve stem 34 in the wall of the housing is a check valve 60 through which air is delivered into the tire when the tire is being inflated or when additional air pressure is required. The valve 60 is a one-way valve which allows air to come down through the valve body and into the tire. In order to relieve pressure within the tire in the event that there is an excessive pressure buildup, the stem 34 is provided at its lower end with an extension 62 which terminates just above the upper end of the check valve 60. By depressing the valve stem 34 slightly, the extension 62 will bear against the check valve, opening it and allowing air to escape out out through the valve body 20.

Once the tire pressure is returned to normal, the device is reset by depressing the valve stem 34 which will then re-engage the track 48 in the manner shown in FIG. 1.

Figure 4:
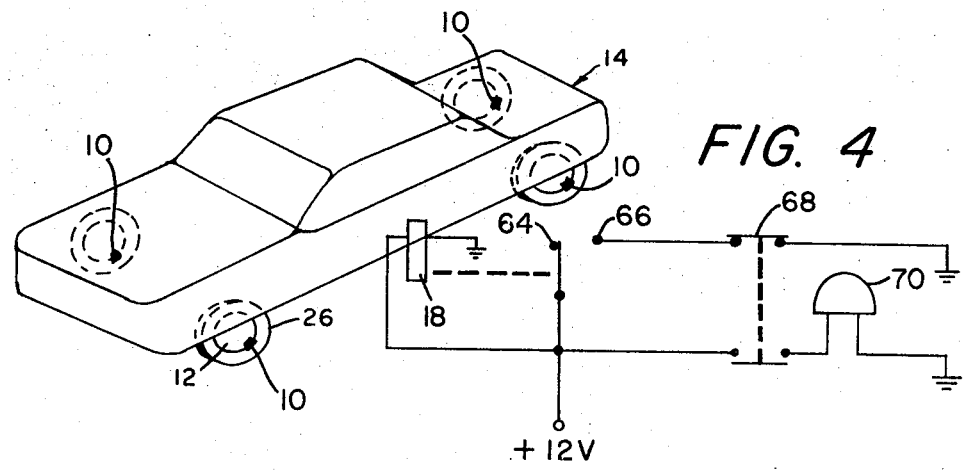
FIG. 4 is a schematic diagram of the sensing and alarm circuitry used in conjunction with the signalling devices.

Referring now more particularly to FIG. 4, the slave reed 18 and its associated circuitry will be described. In practice, a single reed 18 may be employed to respond to the reed 16 of each device 10 or, instead of a single central slave reed, individual slave reeds may be mounted in each tire well in close proximity to an associated device 10. In any event, the slave reed 18 forms part of a latching circuit and is excited at the same frequency as the reed 16. Vibration of the slave reed 18 in response to vibration of the reed 16 causes a momentary contact between contact points 64 and 66 which is sufficient to shift a circuit breaker 68 to a closed position thereby closing a circuit to a dashboard indicator light 70 to warn the driver.

Figure 5:
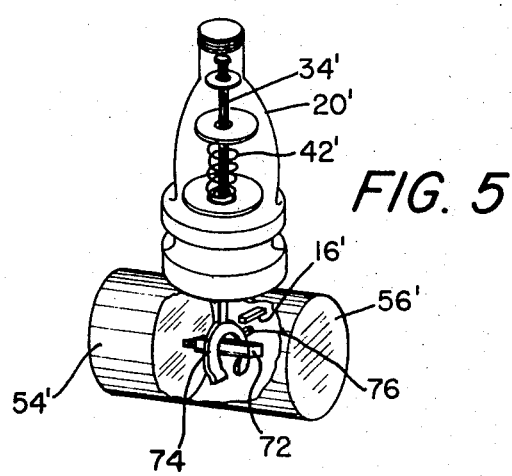
FIG. 5 is a view in perspective partly broken away showing a modification of the invention.

Referring now to FIG. 5 there is illustrated a modification of the invention and in this embodiment a reed 16' mounted in a housing 56' at the lower end of the valve body 20' is actuated by means of a valve stem release mechanism comprised of an angularly rotatable arm 72 extending from a pressure chamber 54 into a horseshoe shaped yoke 74 mounted on the lower end of valve stem 34'. The yoke 74 carries a trip 76 in position to hit against the reed 16' when the valve stem is released. The yoke 74 has a restricted opening at its lower end and, with the arm 72 in the horizontal position shown in FIG. 5, it will engage the lower end of the yoke, holding the yoke and the valve stem in the down position illustrated. However, in the event of a change in pressure, the arm will rotate to a limit of 90° in either direction as by a Bourdon type rotary pressure actuator within the chamber 54. A rotation of 90° in either direction, depending upon whether an increase or decrease in pressure, will turn the arm 72 into a vertical position to release the yoke causing the valve stem to snap upwardly under the force of a spring 42' thereby hitting the reed 16' causing it to vibrate in the manner of the principal embodiment.

Figure 7:
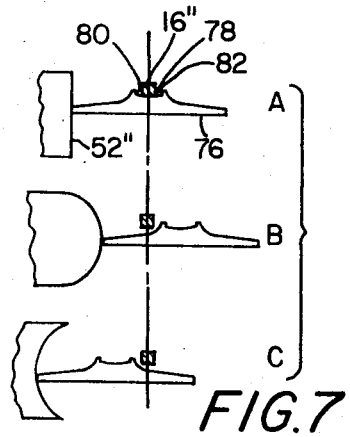
Figure 6:
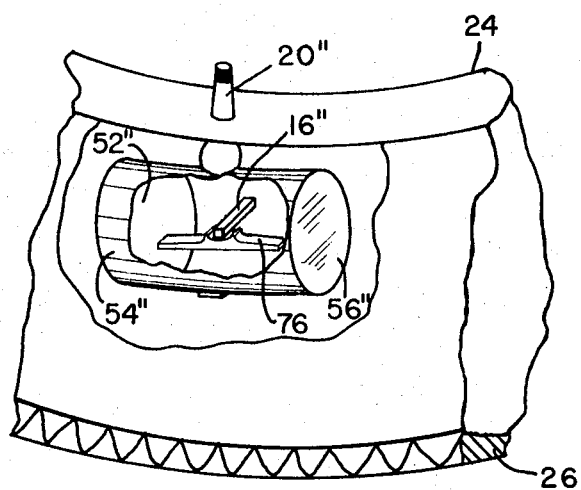
FIG. 6 is a view similar to FIG. 5 showing a further modification of the invention, and FIGS. 7A, B and C are detailed views in side elevation showing the reed actuating mechanism of FIG. 6 in various positions.

Referring now more particularly to FIGS. 6 and 7 there is illustrated a further modification of the invention and in this embodiment a self-resetting device is provided for vibrating a reed 16". The reed 16" is fixed at one end to the inside wall of a housing 56" carried on the inner end of a valve body 20". The housing 56" provided with a pressure chamber 54" and an extensible diaphragm 52" similar to the chamber and diaphragm of the principal embodiment. However, in this embodiment, the diaphragm 52" supports an arm 76 formed with a contoured upper surface characterized by a depressed center section 78 in which the reed 16" normally rides during operation at normal tire pressure. At each end of the center section 78 are shoulders 80 and 82.

As best shown in FIG. 7 A, the reed 16 locates itself at the center of the depressed portion during normal operating pressures. In the event that there is an increase in tire pressure causing the diaphragm 52" to extend the arm 76 as shown in FIG. 7 B, the shoulder 80 will first engage the reed 16" bending it and then releasing it as the shoulder 80 moves past the reed. The snapping action will cause the reed to vibrate with the vibration, in turn, being sensed by the slave reed and circuitry previously described. As tire pressure returns to normal, the reed will reset itself in the depressed section 78. Similarly, as the tire pressure drops, the diaphragm 52" will extend to the left pulling the arm to the left and causing the shoulder 82 to snap the reed to produce vibrations.

In practice, the signalling and slave reeds will be formed to have the same natural frequencies so that when one is vibrated the other will vibrate in sympathy. Also, the natural vibration frequency of the reeds will be selected in a range beyond and frequencies which may occur in the vehicle so that false signals will not be produced.

While the system has been described with particular reference to its use with tires, it also may be used to advantage in conjunction with other pressurized enclosures where the operating pressure must be monitored.

Having thus described the invention what I claim and desire to obtain by Letters Patent of the United States is:

1. A system of monitoring the pressure of a closed chamber such as a vehicle tire or the like, comprising
    a. an acoustical reed mounted in proximity to said chamber and adapted to emit an acoustical signal of predetermined frequency when vibrated,
    b. a movable actuator mounted in proximity to said reed and adapted to vibrate said reed upon specified movement of said actuator,
    c. pressure responsive means communicating with said chamber and movable upon a change in pressure thereof,
    d. said pressure responsive means being operatively connected to said actuator whereby said reed will be vibrated at pre-selected limits of pressure in said chamber,
    e. acoustical sensing means mounted exterior of said chamber and adapted to sense remotely vibration of said reed, and,
    f. signalling means operatively connected to said acoustical sensing means.

2. A system according to claim 1 wherein said actuator includes a spring loaded member and a restraining member engaged therewith, said restraining member being movable to a release position by movement of said pressure responsive means.

3. A system according to claim 2 wherein said spring loaded member is an axially movable stem formed with a stop and said restraining member is an arm perpendicular to said stem and formed with a track engaging said stop, said arm being movable in a plane perpendicular to said stem.

4. A system according to claim 2 wherein said spring loaded member is an axially movable stem formed at one end with a yoked portion defining a restricted opening and said restraining member is an arm normally extending through said yoked portion and locked thereto, said arm being angularly movable from a locked to an unlocked position by said pressure responsive means.

5. A system according to claim 1 wherein said pressure responsive means includes an extensible diaphragm.

6. A system according to claim 1 wherein said actuator is an elongated member disposed perpendicularly to said reed and longitudinally movable by said pressure responsive means, said elongated member being formed with spaced shoulders adapted to engage and vibrate said reed upon movement of said elongated member in either direction.

7. A system according to claim 1 wherein said sensing and signalling means includes a slave reed and a latching circuit operatively connected thereto.

* * * * *